United States Patent [19]

Kawamura

[11] Patent Number: 5,080,081
[45] Date of Patent: Jan. 14, 1992

[54] FOUR-CYCLE HEAT INSULATING ENGINE

[75] Inventor: Hideo Kawamura, Samukawa, Japan

[73] Assignee: Isuzu Motors Limited, Tokyo, Japan

[21] Appl. No.: 540,670

[22] Filed: Jun. 19, 1990

[30] Foreign Application Priority Data

Jul. 17, 1989 [JP] Japan ................. 1-182450

[51] Int. Cl.$^5$ ............................................. F02B 33/00
[52] U.S. Cl. ................................ 123/559.1; 123/76; 123/668
[58] Field of Search ............... 123/559.1, 65 VC, 76, 123/668; 60/605.1

[56] References Cited

U.S. PATENT DOCUMENTS

| | | | |
|---|---|---|---|
| 2,088,923 | 8/1937 | Rafailoff | 123/559.1 |
| 2,422,364 | 6/1947 | Osborn | 123/76 |
| 2,705,480 | 4/1955 | Cambeis et al. | 123/65 VC |
| 3,408,995 | 11/1968 | Johnson | 123/668 |
| 4,069,794 | 1/1978 | Jordan | 123/65 VC |
| 4,169,354 | 10/1979 | Woollenberger | 60/605.1 |
| 4,391,098 | 7/1983 | Kosuge | 60/605.1 |
| 4,557,241 | 12/1985 | Kawachi et al. | 123/559.1 |
| 4,800,853 | 1/1989 | Kraus et al. | |
| 4,864,987 | 9/1989 | Kawamura | 123/668 |

FOREIGN PATENT DOCUMENTS

| | | |
|---|---|---|
| 883528 | 7/1953 | Fed. Rep. of Germany. |
| 1138979 | 11/1954 | Fed. Rep. of Germany. |
| 3149775 | 12/1981 | Fed. Rep. of Germany. |
| 384079 | 6/1985 | Fed. Rep. of Germany. |
| 183805 | 10/1983 | Japan. |
| 122765 | 7/1984 | Japan. |
| 0350327 | 6/1931 | United Kingdom ............... 123/76 |

*Primary Examiner*—E. Rollins Cross
*Assistant Examiner*—M. Macy
*Attorney, Agent, or Firm*—Browdy and Neimark

[57] ABSTRACT

This four-cycle head insulating engine has combustion chambers which consist of cylinder head lower surface portions and cylinder liner upper portions, and which are formed in a heat insulating manner; exhaust valves provided in exhaust ports formed in the cylinder head; suction ports formed in cylinder liner lower portion so as to be spaced in the circumferential direction thereof and opened in the positions before the lower dead points; guide scrolls communicating with the suction ports and formed on the outer circumferential surface of a cylinder block; and a supercharger joined to suction passages communicating with the guide scrolls. Accordingly, this heat insulating engine renders it unnecessary to provide, especially, check valves in the suction system, and enables the degree of freedom of designing the guide scrolls to be improved, and the guide scrolls to be formed to such a shape that allows the suction air to be swirled in a large curve and sucked easily into the cylinders. Moreover, the influence of the high-temperature of the exhaust gas and combustion chamber upper walls upon the suction air is minimized, and a decrease in the flow rate of the suction air is prevented.

5 Claims, 3 Drawing Sheets

FOUR-CYCLE HEAT INSULATING ENGINE

BACKGROUND OF THE INVENTION

1. Field of the Invention

This invention relates to a four-cycle heat insulating engine provided with a supercharger consisting of a turbocharger or a compressor.

2. Description of the Prior Art

A conventional heat insulating engine in which ceramic cylinder head liners having cylinder liner portions are fitted in bores in a cylinder head is disclosed in, for example, Japanese Patent Laid-open No. 122765/1984.

In general, in an operation of a gasoline or diesel engine, four strokes, i.e. a suction stroke, a compression stroke, an explosion stroke (combustion stroke) and an exhaust stroke are carried out in order repeatedly. It is only in an explosion stroke among these four strokes that power is generated with torque transmitted to a crankshaft, and, in the other three strokes, the engine is rotated by an inertial force. There are two kinds of systems, i.e. a four cycle engine and a two-cycle engine which employ the operational principles of these strokes. Especially, a four-cycle engine is an engine which requires time corresponding to four strokes of a piston, i.e. two turns of a crankshaft to complete one cycle by carrying out the above-mentioned four operations in every one stroke of the piston. Thus, in a four-cycle engine, one stroke, i.e. sufficiently much time is given for making exhaust and suction strokes, and the volume efficiency and average effective pressure are high. The efficiency of the engine is specially high in a high-speed region, and one explosion stroke is made per two turns of the crankshaft. This enables the thermal load on each part to be reduced.

In such a heat insulating engine, the cylinder head and the combustion chamber in a cylinder formed in the cylinder block are formed in a heat insulating state out of a heat insulating material or a ceramic material, so that the temperature of the interior of the cylinder increases to a high level to cause a decrease in the volume efficiency and engine output. The reasons why these phenomena occur reside in the following. The suction and exhaust valves are provided in the cylinder head so that these valves are close to each other. Moreover, since the cylinder head and cylinder upper portion in the heat insulating engine are formed in a heat insulating manner, the temperatures of the upper portion of the combustion chamber and the inner surface thereof become high, i.e., the temperatures of the exhaust gas and the upper portion of the combustion chamber increase to a considerably high level. Therefore, the suction port and suction air are apt to be influenced by the heat of the exhaust port, upper wall of the combustion chamber and exhaust gas, and the fresh air sucked into the cylinder receives heat from the interior of the cylinder or the inner surface thereof to be heated and expanded. When the suction air is expanded due to such a thermal influence, the suction rate of the air is reduced extremely by, for example, not less than 20% to cause the suction efficiency to decrease.

In an engine of a two-cycle operation, a suction port is provided in a cylinder liner lower portion, and, when an exhaust valve is opened, pressure waves, i.e. pulse waves occur in the cylinder, whereby the exhaust gas is forced out through an exhaust port to carry out the air exchange. The fresh air then flows from the lower portion of the cylinder into a negative pressure zone occurring on the rear side of this exhaust gas. Since the lower portion of the cylinder is not heated to a high temperature as compared with a cylinder head, the fresh air is not influenced much by the temperature of the inner surface of the cylinder lower portion. This indicates that, if the fresh air is sucked from a cylinder lower portion by carrying out a two-cycle operation in, especially, a heat insulating engine, the flow rate of the scavenging air or suction air does not decrease.

A conventional valve mechanism for internal combustion engines, in which suction and exhaust valves are formed and operated electrically is disclosed in, for example, Japanese Patent Laid-open No. 183805/1983.

SUMMARY OF THE INVENTION

An object of the present invention is to solve these problems and provide a four-cycle heat insulating engine in which cylinder head lower surface portions and cylinder liner upper portions are formed at least in a heat insulating manner, provided with suction ports formed at cylinder liner lower portions, which are spaced from exhaust ports, in view of the fact that the temperature of the cylinder liner lower portions spaced from the cylinder head the temperature of which becomes high is not so high, in such a manner that the suction air is not influenced by the temperature of the inner surface of the cylinder head in which the exhaust ports are provided, and the temperature of the exhaust gas, a supercharger, such as a turbo-charger or a compressor being joined to suction passages so as to improve the suction air introducing condition in compensation for a decrease in the suction period occurring due to the provision of the suction ports in the cylinder liner lower portions, whereby the suction efficiency is improved to enable check valves to be eliminated from the suction passages, and guide scrolls at the outer circumferential portions of the suction ports to be formed to such a shape that allows the suction air to flow into the cylinders effectively.

Another object of the present invention is to provide a four-cycle heat insulating engine comprising cylinder head lower surface portions and cylinder liner upper portions which are formed in a heat insulating manner, exhaust valves provided in exhaust ports formed in the cylinder head lower surface portions, suction ports formed so as to be spaced in the circumferential direction of cylinder liner portions and opened into cylinders in a position before a lower dead point, guide scrolls communicating with the suction ports and formed at the outer circumferential portions of the cylinder liners, and a supercharger joined to suction passages communicating with the guide scrolls.

In the four-cycle heat insulating engine constructed as described above, the suction ports are provided in the cylinder liner lower portions in a low-temperature region distant from the cylinder head in a high-temperature region in which the exhaust ports are provided. Therefore, the suction air is not influenced by the high temperature of the inner surfaces of the cylinder head and combustion chamber upper portions and exhaust gas, and the temperature of the suction air does not increase. Accordingly, the thermal expansion of the suction air, which causes a decrease in the suction efficiency, can be avoided. Moreover, owing to a large difference between the pressure, which is increased by a turbo-charger, of the suction air and that of the vacuum spaces occurring in the combustion chambers, and a large cross-sectional area of the suction ports provided around the cylinder liner lower portions, the suction efficiency can be improved.

Since a supercharger, such as a turbo-charger is provided, a reverse flow of the exhaust gas into the suction passages during the explosion and exhaust strokes can be prevented, and the exhaust valves are opened at the end of an explosion stroke, i.e. a work stroke, i.e. before the bottom dead center, the exhaust gas in the cylinders being discharged due to a blowdown phenomenon to cause the pressure in the cylinders to suddenly decrease. Moreover, the exhaust gas works on a turbine in the turbocharger to operate the turbo-charger forcibly and make the compressor function to a maximal extent, and the suction air from the compressor is sent into the suction passages and then flows in the form of jet currents into the cylinders, i.e. combustion chambers through the suction ports. Since the suction ports are formed incliningly with respect to the radial direction of the cylinder liners, the suction air can be introduced in forcible circumferential swirls into the cylinders.

The suction air, i.e. fresh air flows into the cylinders while pushing the exhaust gas forward. The suction ports are then closed with the rising pistons, and the exhaust valves are closed with the fresh air of a high oxygen concentration remaining in the cylinders, to complete an exhaust stroke.

After the completion of the exhaust stroke, the exhaust valves are closed, and the pistons move down to enter into a vacuum stroke (a first half of a suction stroke), the interior of the cylinders, in which the fresh air of a high oxygen concentration is expanded, thereby becoming vacuous. Since the suction ports are opened before the bottom dead center of the pistons in the latter half of the suction stroke, the suction air is sucked in one rush in a short period of time into the cylinders in a vacuous state by an operation of the supercharger.

During this time, the suction air the pressure of which is increased by an operation of the turbo-charger, stands by in the suction passages and guide scrolls, and the interior of the cylinders become vacuous, so that a differential pressure is very high. Accordingly, when the suction ports are opened, the suction air in a low-temperature condition is introduced in one rush in a short period of time without being thermally influenced at the cylinder liner lower portions into the cylinders in a vacuous state. Therefore, the suction efficiency can be improved.

Moreover, the pressure of the suction air is increased by the supercharger, and a reverse flow of the exhaust gas does not occur in an exhaust stroke. Consequently, it is unnecessary to provide check valves, and the degree of freedom of designing the guide scrolls around the suction ports in the cylinder liner lower portions. This enable the guide scrolls to be formed to such a shape that allows the diameter of the swirl of suction air to be increased, and the suction air to be thereby sucked easily into the cylinders.

The techniques included in this four-cycle heat insulating engine can be applied to a diesel engine of a direct injection type provided with fuel injection nozzles in a cylinder head or of an auxiliary chamber type having main and auxiliary combustion chambers, or a diesel engine provided with fuel supply means, such as fuel injection nozzles in the suction passages.

DESCRIPTION OF THE PREFERRED EMBODIMENTS

The embodiments of the four-cycle heat insulating engine according to the present invention will now be described with reference to the drawings.

Figure 1:
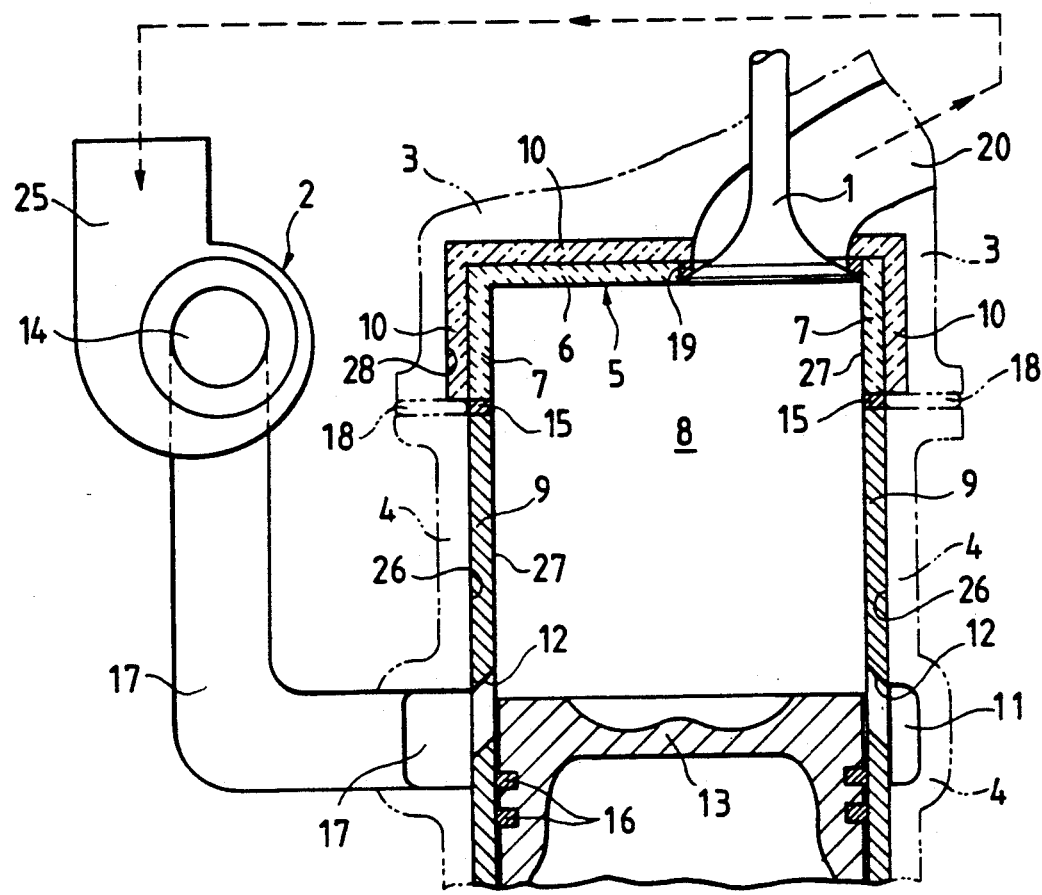
FIG. 1 is a sectional view showing an embodiment of the four-cycle heat insulating engine according to the present invention and taken along the line I—I in FIG. 2.
Figure 2:
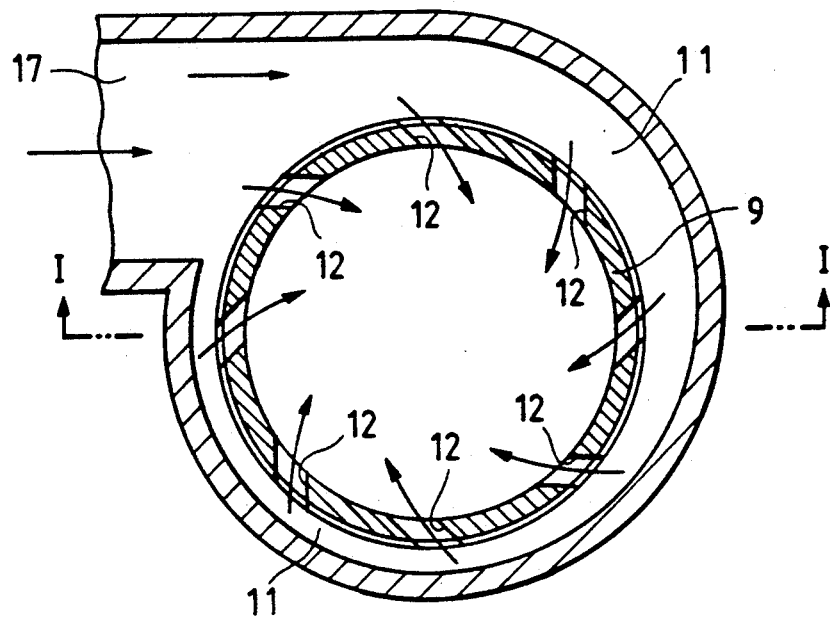
FIG. 2 is a sectional view of a cylinder liner lower portion of the four-cycle heat insulating engine of FIG. 1.

FIGS. 1 and 2 show an embodiment of the four-cycle heat insulating engine according to the present invention. FIG. 1 is a schematic section of the embodiment of the four-cycle heat insulating engine, and FIG. 2 a sectional view of a cylinder liner lower portion of the four-cycle heat insulating engine of FIG. 1.

This four-cycle heat insulating engine has a cylinder block 4, cylinder liners 9 which are fitted in bores 26 formed in the cylinder block 4, and which constitute cylinders 27, a cylinder head 3 fixed to the cylinder block 4, and pistons 13 adapted to be moved reciprocatingly in the cylinder liners 9. In this engine, combustion chambers 8 are formed in a heat insulating manner, and a suction stroke, a compression stroke, an explosion stroke and an exhaust stroke are carried out repeatedly in accordance with the movements of the pistons 13. Exhaust valves 1 are provided in the cylinder head 3, and an exhaust stroke is made with an air current flowing in a predetermined direction with respect to the center line of each cylinder. Valve seats 19 are provided at the inlet portions of exhaust ports 20, and the exhaust valves 1 are disposed so that they are opened and closed with the valve faces disengaged from and engaged with the valve seats 19. The techniques included in this four-cycle heat insulating engine can be applied to a direct injection type diesel engine provided with fuel injection nozzles (not shown) in a cylinder head 3, an auxiliary chamber type diesel engine (refer to FIG. 5), or an alcohol injection engine (not shown).

In this four-cycle heat insulating engine, cylinder liners 9 are fitted in the bores 26 in the cylinder block 4 fixed to the cylinder head 3 via gaskets 18, to form cylinders 27. The cylinder liners 9 are provided at the lower portions thereof with circumferentially spaced suction ports 12, which are opened into guide scrolls 11 constituting the annular suction passages in the cylinder block 4. Moreover, since the suction ports 12 are formed incliningly with respect to the radial direction of the cylinder liners 9, the suction air can be introduced in powerful circumferential swirls into the cylinders 27. The guide scrolls 11 communicate with suction passages 17, to which a supercharger consisting of a turbocharger or a compressor is connected.

A turbo-charger 2 is shown as the supercharger in FIG. 1. The exhaust gas discharged from the exhaust ports is introduced as shown by a broken line into a turbine scroll 25 in the turbo-charger 2. The turbo-charger 2 consists of a turbine and a compressor 14, and the exhaust gas working on the turbine blades through the turbine scroll 25 gives a rotational force to the turbine, this rotational force being transmitted to an impeller of the compressor 14, the suction air being supplied to the suction passages 17 by an operation of the impeller.

The upper portions of the combustion chambers 8 are formed as follows. The integrally formed head liners 5 consisting of lower surface portions 6 of the cylinder head 3 and liner upper portions 7 constituting the cylinders 27 are composed of a ceramic material, such as silicon nitride ($Si_3N_4$) and silicon carbide (SiC) and fitted in the bores 28 formed in the cylinder head 3, and heat insulating gaskets 10 consisting of a heat insulating material are interposed between the outer surfaces of the cylinder head liners 5 and the cylinder head lower surface portions 6. Heat insulating gaskets 15 consisting of a heat insulating material are interposed between the lower end surfaces of the cylinder liner upper portions 7 in the cylinder head liners 5 and the upper end surfaces of the lower portions of the cylinder liners 9 so as to prevent the occurrence of flows of heat from the cylinder liner upper portions 7 to the lower portions of the cylinder liners 9. The pistons 13 adapted to be moved reciprocatingly in the cylinders are formed in a heat insulating manner out of a ceramic material (not shown). Referring to the drawings, a reference numeral 16 denotes piston rings.

Since the heat insulating gaskets 15 are provided between the lower surfaces of the cylinder liner upper portions 7 and the upper surfaces of the cylinder liners 9, the temperature distribution of the wall surfaces defining the combustion chambers 8 becomes as follows. For example, if the temperature of the cylinder head lower portions 6 constituting a fire deck of the cylinder head 3 is 600° C., the temperature of the boundary portions in which the heat insulating gaskets 15 are provided is 300° C., and that of the lower portion of the cylinder liner 9 in which the suction ports 12 are formed is not higher than 200° C. Accordingly, this four-cycle heat insulating engine can be formed to an ideal structure in which the combustion chambers 8 are heat insulated in a combustion stroke of the engine and cooled in an expansion stroke thereof.

In this four-cycle heat insulating engine, the suction ports 12 are formed in the circumferential parts, which are before the lower dead point of the pistons 13, of the lower portions of the cylinder liners 9, and guide scrolls 11, which constitute the annular passages communicating with the suction passages 17, are formed on the outer circumferential surfaces of the cylinder liners 9. These suction ports 12 communicate with the guide scrolls 11, and formed incliningly with respect to the radial and axial directions of the cylinder liners 9 so that the suction air flows along streamlines. Since the suction ports 12 are formed in such positions, they communicate with the interior of the cylinders, i.e. the combustion chambers 8 in the positions in the vicinity of the bottom dead centers of the pistons 13 but they are closed in the explosion and exhaust strokes. In the positions in the vicinity of the positions of termination of an explosion stroke, i.e., in the positions in the vicinity of the bottom dead centers of the pistons 13, the exhaust gas does not flow reversely into the suction passages 17 owing to the compressed air from the turbo-charger 2. In the positions in the vicinity of the positions of termination of a vacuum stroke following an exhaust stroke with the pistons positioned close to the bottom dead centers, the interior of the combustion chambers 8 is vacuous, so that the suction air is introduced in one rush into the combustion chambers 8 owing to an operation of the turbo-charger 2. If the boost pressure is increased during a low-speed operation of the engine by controlling the operational condition of the turbo-charger 2, the torque in a low-speed operation of the engine can be increased.

The exhaust valves 1 may be opened and closed by valve operating mechanisms, such as cams in the same manner as in an ordinary engine, and they may, of course, be opened and closed by electromagnetic valve driving means.

This four-cycle heat insulating engine can also be constructed so that the exhaust valves 1 are opened and closed by an electromagnetic force. In such an engine, the opening and closing of the exhaust valves can be controlled optimally in response to a signal from position sensors, which are adapted to detect the stroke positions, i.e. crank angles of the pistons, independently of the rotation of the crankshaft. The electromagnetic driving means for the exhaust valves 1 are adapted to open and close the valves by an electromagnetic force, and capable of being controlled by a controller which receives signals from a revolution sensor for detecting the number of revolutions per minute of the engine, an engine load detecting sensor, a position sensor for detecting a stroke positions, i.e. crank angles of the pistons 13, and a sensor for detecting the flow rate of suction air, and which is adapted to give instructions in response to these signals. The engine load sensor is adapted to detect an engine load, which can be detected by detecting a supply rate of the fuel from the fuel injection nozzles to the engine or an acceleration pedal stepping rate.

A fuel injector for controlling the fuel supplied to the engine has fuel injection nozzles, and the fuel injected from the injection nozzles into the combustion chambers 8 via the upper portion of the cylinder head 3 is atomized and introduced into the cylinders. This fuel injector is controlled so that a predetermined quantity of fuel is injected in accordance with the instructions from the controller. The revolution sensor is provided on the output shaft of the engine to detect the number of revolutions per minute of the engine. This number of revolutions per minute of the engine, i.e. a revolution signal is inputted into the controller.

Figure 3:
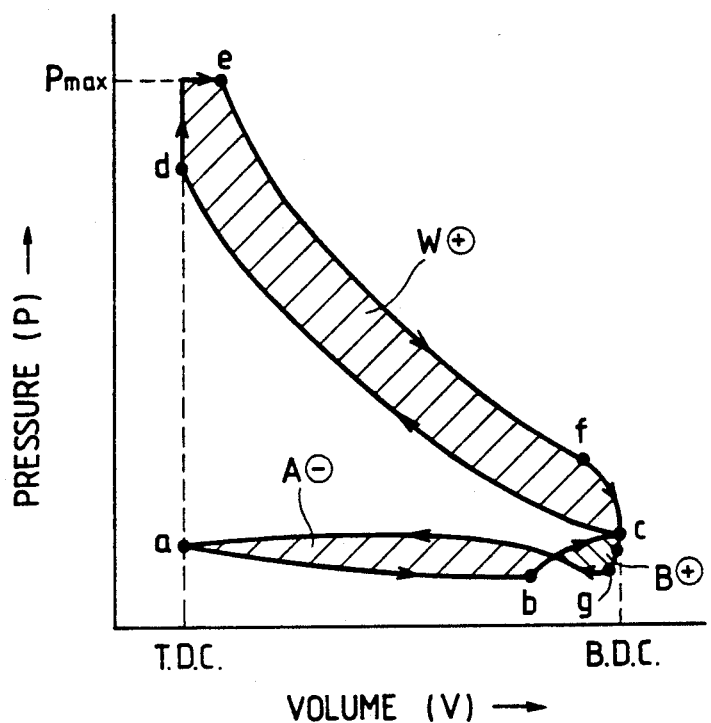
FIG. 3 is a P-V diagram of the same four-cycle heat insulating engine.

The four-cycle heat insulating engine according to the present invention is constructed as described above. The operation cycle of this heat insulating engine will now be described with reference to FIGS. 3, 4A, 4B, 4C and 4D. FIG. 3 is a P-V diagram of the four-cycle heat insulating engine according to the present invention, and FIGS. 4A, 4B, 4C and 4D illustrate the condition of each part of an operation cycle.

Referring to FIG. 3, the variation of the condition of gas in a cylinder in one cycle is shown for explaining an operation cycle of the engine, and the volume V and pressure P are plotted in the abscissa and ordinate, respectively. Since the pressure receiving area of a piston is constant, the abscissa can indicate the positions of a moving piston. The left end of the abscissa corresponds to the top dead center (T.D.C.), and the right end thereof the bottom dead center (B.D.C.). A piston stroke is a function of a crank angle, and the pressure P in the ordinate can be plotted as a crank angle.

In a suction stroke of an engine cycle, the exhaust valves 1 are closed by, for example, magnetic valve driving means, and the pistons 13 move down from the top dead center, i.e. a point a in FIG. 3. At this time, a vacuum stroke in which the negative pressure in the cylinders, i.e. combustion chambers 8 gradually increases starts, and, during this stroke, the pistons 13 perform negative work (shown by slanting lines A). If the pistons 13 are set so that the suction ports 12 are opened into the cylinders when the pistons 13 then reach a position in the vicinity of the bottom dead center, i.e. a point b, for example, a position close to a point before the bottom dead center, i.e. a position close to a point corresponding to a crank angle of 50°, the suction air sent from the compressor 14 consisting of the turbocharger 2 is supplied as compressed air to the suction passages 17, and the fresh air of a high oxygen concentration which will be described later is expanded in the first half of the suction stroke, i.e. vacuum stroke in the cylinders, i.e. combustion chambers 8, so that the interior of the combustion chambers 8 becomes vacuous to cause a difference between the pressure therein and that of the suction air to become large. Therefore, the suction air turns into a jet current and flows in one rush into the cylinders through the suction passages 17, guide scrolls 11 and suction ports 12 in the latter half of the suction stroke to cause the pistons 13 to be pressed down. Consequently, the pressure in the cylinders increases from the point b to a point c, and the pistons 13 reach the bottom dead center, i.e. the point c.

Figures 4A, 4B, 4C, 4D:
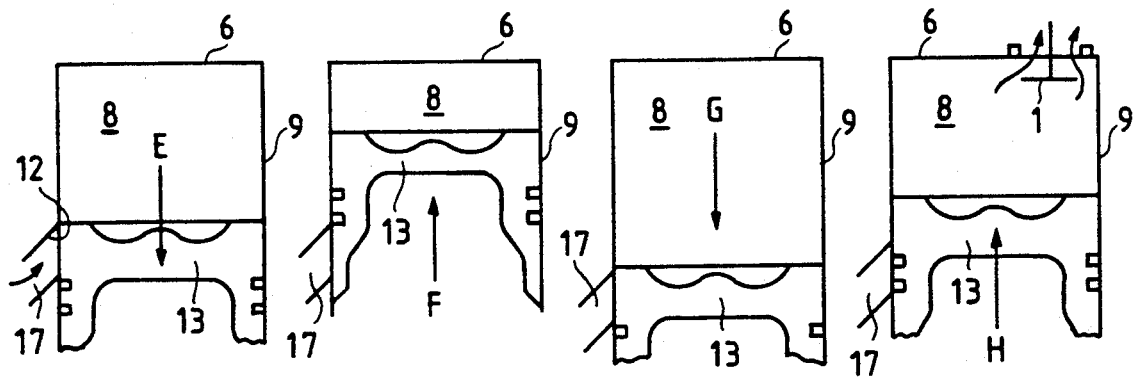
FIGS. 4A, 4B, 4C and 4D illustrate the condition of each stroke of an operational cycle of the four-cycle heat insulating engine according to the present invention.

The suction stroke then changes to a compression stroke as shown by an arrow F in FIG. 4B with the pistons 13 moving up from the bottom dead center, i.e. the point c in FIG. 3. The pistons 13 first pass the suction ports 12 to stop the sucking of the air, so that the suction air in the cylinders is compressed. The pistons 13 continue to be moved up, and the gaseous mixture is compressed until the pressure thereof reaches a point d, the temperature and pressure of the gaseous mixture thereby increasing. At the end of the compression stroke, i.e., at the top dead center, the gaseous mixture is ignited, and an explosion stroke starts. The gaseous mixture is burnt, so that the pressure in the cylinders reaches a maximum level $p_{MAX}$, and a combustion period along the line from the point d to a point e terminates.

In the explosion stroke, the pistons 13 are pressed down as shown by an arrow G in FIG. 4C along the line from the point e to a point f by the high-pressure gas occurring due to the combustion of the gaseous mixture, to perform the work. The work stroke progresses, and the pistons are moved down as the exhaust gas is subjected to afterburning, to perform positive work (shown by slanting lines W). The work stroke continues until the pistons reach a point in the vicinity of the bottom dead center, i.e. the point f, where the exhaust valves 1 are opened. When the exhaust valves are opened, the exhaust gas is ejected at a sonic speed into the exhaust pipes to cause blowdown to occur, and the pressure in the cylinders decreases suddenly to reach a point g, where the work stroke terminates. At this time, the suction ports 12 are opened and the turbo-charger is operated strongly by the exhaust gas in a blowdown phenomenon with the fresh air from the compressor standing by in a boosted state in the suction passages 17.

Therefore, the exhaust gas does not flow back to the suction passages 17, and the fresh air turns into pulse waves and pushes the exhaust gas, the fresh air being then sucked into the combustion chambers 8. Moreover, the fresh air, i.e. suction air reduces the temperature of a residual gas while lowering the temperature of the interior of the cylinders, i.e. combustion chambers 8.

An exhaust stroke is then made as shown by an arrow H in FIG. 4D, along the line from the point g to the point a, and the exhaust gas generated as the work stroke is made is discharged to the outside of the cylinders, i.e. the outside of the combustion chambers 8. The suction air introduced into the cylinders turns into pulse waves and pushes the rear portion of the exhaust gas toward the outside as it moves up in the cylinders. The suction air reduces the temperature of the residual gas as it lowers the temperature of the interior of the cylinders, i.e. combustion chambers 8, and the exhaust valves 1 are closed when the pistons 13 are at the top dead center. The suction air remains in the cylinders in this condition as a residual gas of a comparatively high oxygen concentration. A vacuum stroke, i.e. suction stroke is then started as shown by the arrow E in FIG. 4A, from the point a to the point b to expand the residual gas of a comparatively high oxygen concentration.

Therefore, while the pistons 13 are moved down in a vacuum stroke following an exhaust stroke in the four-cycle heat insulating engine according to the present invention, negative work (shown by slanting lines A in FIG. 3) is performed, and positive work shown by slanting lines B in FIG. 3 occurs, so that the negative work (shown by the slanting lines A in the drawing) is reduced by the quantity corresponding to that of the positive work (shown by the slanting lines B in the drawing). Thus, the positive work (shown by the slanting lines W) does not substantially decrease to a great extent. Moreover, the suction air is introduced from the cylinder liner lower portions into the cylinders, which are in a low-temperature vacuous state, in one rush in a short period of time without even generating time for being thermally influenced. Accordingly, in, especially, a heat insulating engine, the suction efficiency during a low rotational speed operation thereof can be improved.

Figure 5:
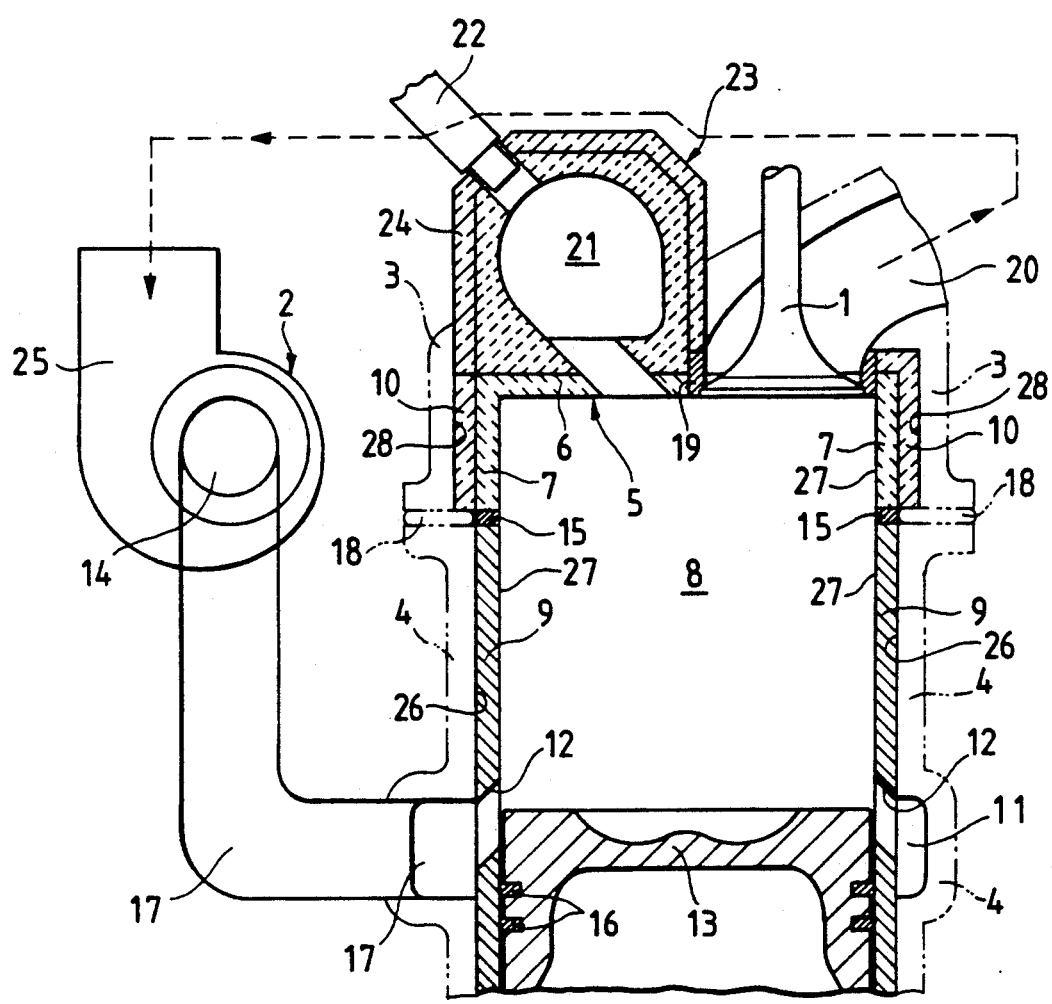
FIG. 5 is a sectional view of another embodiment of the four-cycle heat insulating engine according to the present invention.

Another embodiment of the four-cycle heat insulating engine according to the present invention will now be described with reference to FIG. 5. The four-cycle heat insulating engine of the previously-described embodiment is a direct injection type engine having a single combustion chamber in each cylinder, and fuel injection nozzles in the cylinder head, or an engine having fuel supply means, such as fuel injection nozzles in the suction passages 17, while the four-cycle heat insulating engine of the second embodiment is an auxiliary chamber type engine having combustion chambers 8 as main combustion chambers, and auxiliary combustion chambers 21 provided with fuel injection nozzles 22. The parts of the four-cycle heat insulating engine of FIG. 5 which are identical with those of the four-cycle heat insulating engine of FIG. 1 are designated by the same reference numerals, and repeated descriptions of such parts will be omitted. The auxiliary combustion chambers 21 in the four-cycle heat insualting engine of the second embodiment are formed in a heat insulating manner, and consist, for example, of auxiliary chamber walls 23 made of a ceramic material, such as silicon nitride ($Si_3N_4$) and silicon carbide (SiC), and heat insulating gaskets 24 made of a heat insulating material and covering the outer circumferential surfaces of the auxiliary chamber walls 23. Since the operational cycle of this four-cycle heat insulating engine is identical with that of the previously-described embodiment, the description thereof will be omitted.

What is claimed is:

1. A four-cycle heat insulating engine having a cylinder block, cylinder liners fitted in bores in said cylinder block to form cylinders, a cylinder head fixed to said cylinder block, pistons adapted to be moved reciprocatingly on the inner side of said cylinder liners, combustion chambers of heat insulating structures defined by said cylinder head and said cylinder liners, exhaust ports formed in said cylinder head, exhaust valves provided in said exhaust ports, a plurality of suction ports formed at the lower circumferential portions of said cylinder liners, guide scrolls communicating with said suction ports and formed at the lower portion of said cylinder block, suction passages communicating with said guide scrolls, and a supercharger joined to said suction passages so as to supply pressurized suction air into said cylinders, suction, compression, explosion and exhaust strokes being made in each cycle of said piston sequentially and repeatedly, characterized in that:

said exhaust valves are opened just before the terminal end of an explosion stroke and closed at the terminal end of an exhaust stroke, said suction ports and said exhaust valves are opened just before the terminal end of an explosion stroke, so that a combustion gas in said cylinders is discharged via said exhaust ports with the air supplied via said suction ports to the interior of said cylinders by said supercharger, the resultant air causing the temperature in said cylinders to decrease and being discharged via said exhaust ports in a subsequent exhaust stroke, said exhaust valves are closed at the terminal end of an exhaust stroke, said pistons being moved down in a subsequent suction stroke while said exhaust valves remain closed, whereby residual gas in said cylinders is expanded to cause the interior of said cylinders to become vacuous and to be cooled, said piston being further moved down to cause said suction ports to be opened, so that the suction air pressurized by said supercharger flows into said cylinders.

2. A four-cycle heat insulating engine according to claim 1, wherein said supercharger is a turbo-charger adapted to be driven by the exhaust gas from said exhaust ports.

3. A four-cycle heat insulating engine according to claim 1, wherein said cylinder head is provided with a plurality of said exhaust ports per cylinder, said exhaust ports being provided with said exhaust valves.

4. A four-cycle heat insulating engine according to claim 1, wherein said suction ports in said cylinder liners are formed incliningly with respect to the radial direction of said cylinder liners so that said suction air flowing from said guide scrolls into said cylinders forms swirls.

5. A four-cycle heat insulating engine according to claim 1, wherein said combustion chambers of heat insulating structures consist of head liners which are provided in bores formed in said cylinder head, and which are composed of cylinder head lower surface portions provided with said exhaust ports and formed out of a ceramic material, and cylinder liner upper portions formed unitarily with said cylinder head lower surface portions and formed out of a ceramic material; and insulating gaskets provided between said head liners and said bores in said cylinder head and formed out of a heat insulating material.

* * * * *